Feb. 18, 1958  E. W. WEILER  2,823,460
MEASURING INSTRUMENTS
Filed Dec. 14, 1955
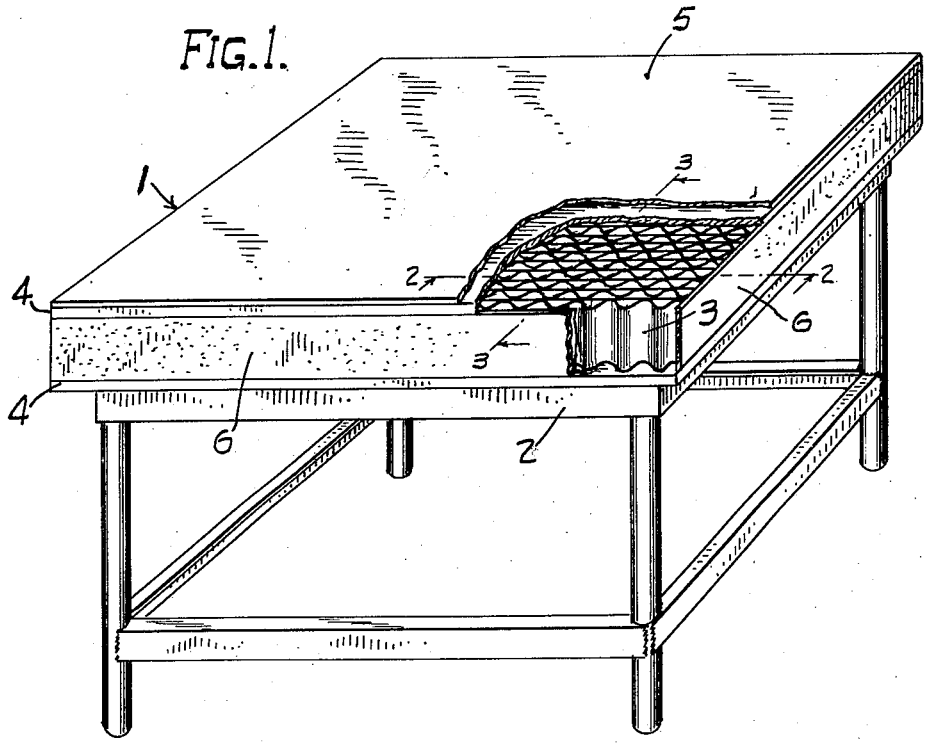
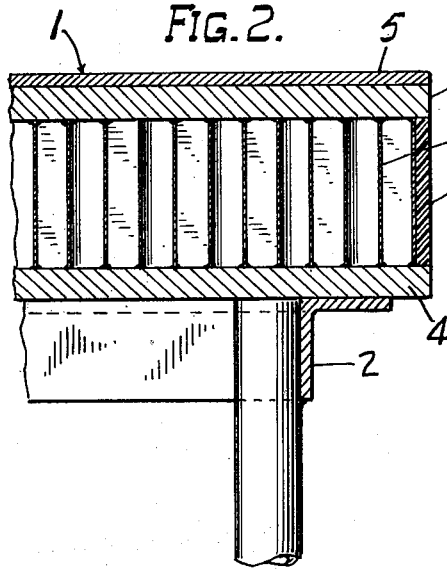
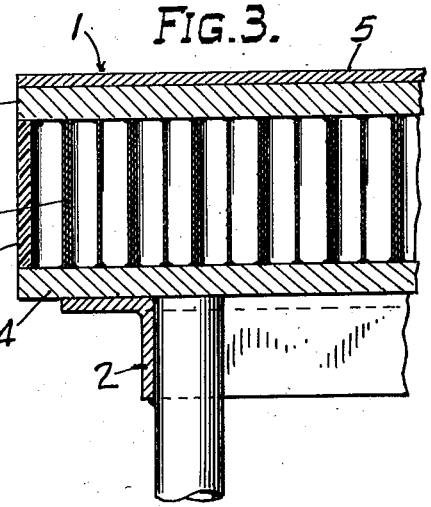
INVENTOR.
Edward W. Weiler
BY
Andrus & Scealen
ATTORNEYS.

United States Patent Office 2,823,460
Patented Feb. 18, 1958

2,823,460

MEASURING INSTRUMENTS

Edward William Weiler, New York, N. Y., assignor to J. C. Busch Company, Milwaukee, Wis., a corporation of Wisconsin Application December 14, 1955, Serial No. 553,080

1 Claim. (Cl. 33—174)

This invention relates to measuring instruments, and more particularly to large surface plates used in industry for precision measuring, photogrammetric plotting and the like.

Heretofore, surface plates and other measuring apparatus have been made of solid cast iron or other hard metal which provided the required rigid support for measuring. The top surfaces of such plates were usually hand scraped and/or ground to provide the necessary smoothness and flatness.

Because the objects to be measured, together with box parallels, straight edges or the like are often quite heavy, it has been necessary to design the surface plates for great strength and rigidity. Prior to the present invention, solid cast iron construction has been considered the only practical way to obtain these features.

Problems have arisen in the use of cast iron multiplex tables, surface plates and the like, especially in regard to weight. Some have weighed up to several tons, which has caused substantial handling and installation difficulties.

The present invention solves these problems inherent in the former construction by providing a structure having spaced back-up plates of lightweight metal joined together by a cellular core of honeycomb, corrugated or other similar construction. A hard metal layer is secured to the upper back-up plate, the layer being accurately finished to provide a precision measuring surface of extremely high rigidity.

The accompanying drawing illustrates the best mode presently contemplated by the inventor for carrying out the invention.

In the drawing:

Figure 1 is a perspective view of a surface plate constructed in accordance with the invention, with a portion of one corner broken away and sectioned;

Fig. 2 is a broken longitudinal section of the surface plate, taken on line 2—2 of Figure 1; and Fig. 3 is a broken transverse section of the surface plate, taken on line 3—3 of Figure 1.

As shown in the drawings, the invention is embodied in a surface plate 1 which is secured to and supported by any suitable supporting structure, such as a table 2.

Surface plate 1 shown comprises a cellular honeycomb core 3 which is light in weight and sufficiently rigid to withstand substantial downward forces. Core 3 may be made of aluminum foil, glass fabric, kraft paper impregnated with a phenolic resin or other suitable material.

Facing plates 4 are secured to the upper and lower surfaces of core 3 by a pressure thermosetting adhesive or the like, and serve as additional support for the core giving rigity thereto as well as a means to seal the pockets of the individual honeycomb from the atmosphere. Plates 4 are preferably of strong metal, such as carbon steel, aluminum, magnesium, titanium, or alloys thereof.

While the top facing plate 4 is sufficiently resistant to downward pressures, due to the strength and rigidity of the composite cellular core 3 and the upper and lower plates 4, it has been found that the material used in the plate does not have the required hardness for surface plate applications. To provide the necessary hard surface, a thin layer or sheet 5 of carbon steel, Invar or the like, is disposed over top plate 4 and secured thereto in any suitable way such as that shown in copending application Serial No. 488,040, filed February 14, 1955, by Everett M. Roeder, now abandoned, and assigned to the assignee of the present application. After sheet 5 is secured to upper plate 4, it is machined, ground or hand scraped to the required close tolerance flatness.

The edges of surface plate 1 between facing plates 4 may be sealed by applying a filler material 6 such as plastic wood or aluminum cement, around the edges of the structure. This will prevent contamination, deterioration and weakening of core 3 from external sources. It may be possible to secure an aluminum channel around the edges of surface plate 1 to form the seal.

The resultant structure is extremely light in comparison with prior surface plates of solid construction, and yet it has been found to be extremely rigid. The top of the surface plate will not be deformed more than .0002 inch, even under extremely heavy loads, thereby maintaining an accurate, close tolerance surface for measuring.

The porous or cellular core 3 must have sufficient rigidity to maintain the accuracy of the top surface 5. For this purpose a honeycomb, corrugated, waffle type, diamond shaped or other similar structure may be employed, and in the accompanying claim the term "cellular" is intended to include all such structures wherein lightness in weight is obtained by substantial air pockets distributed throughout the core without sacrifice of rigidity and strength. In general, the rigidity should prevent deflection greater than .0002 inch from flatness.

The core 3 may be constructed of almost any material that can be fabricated into the desired cellular structure and that will then provide the necessary rigidity. Such materials as metal foils, aluminum alloy and stainless steel sheets, magnesium alloy, titanium alloy, kraft paper impregnated with a phenolic resin, wood, rubber, glass, cotton fabrics and various synthetic resins and the like are generally suitable.

The facing sheets 4 may be made of various alloys such as aluminum alloys, steel, magnesium alloys and titanium alloys, or of organic materials such as plywood or various synthetic plastics.

While the invention has been illustrated as applied to a surface plate, it is also applicable to the construction of straight edges, angles, box parallels and similar apparatus for use in precision measuring.

Various embodiments of the invention may be employed within the scope of the following claim which particularly points out and distinctly claims the subject matter regarded as the invention.

I claim:

A lightweight surface plate for precision measuring requiring resistance to deflection under substantial load during the measuring operation, photogrammetric plotting or the like, comprising a lightweight cellular core member having an upper and lower surface, a facing plate of lightweight metal adhesively secured to the upper surface of said core member, a second facing plate of lightweight material adhesively secured to the lower surface of said core member, a layer of hard metal secured to the outer surface of said first named plate, said layer having a precision-made outer surface to provide close tolerance control for measuring purposes, and means to seal the edges of said surface plate between the facing plates to prevent weakening of said core due to external causes, said surface plate being substantially rigid and capable of resisting deflection in excess of .0002 inch under load.

References Cited in the file of this patent

UNITED STATES PATENTS

| | | |
|---|---|---|
| 1,426,658 | McGuckin | Aug. 22, 1922 |
| 1,475,963 | Osterlind | Dec. 4, 1923 |
| 1,934,788 | Bole | Nov. 14, 1933 |
| 2,053,244 | Turk | Sept. 1, 1936 |
| 2,336,506 | Saunders | Dec. 14, 1943 |
| 2,491,672 | Lowenstein | Dec. 20, 1949 |
| 2,609,068 | Pajak | Sept. 2, 1952 |
| 2,644,777 | Havens | July 7, 1953 |
| 2,729,894 | Andrews | Jan. 10, 1956 |

FOREIGN PATENTS

| | | |
|---|---|---|
| 551,361 | Great Britain | Feb. 18, 1943 |

OTHER REFERENCES

Plastics, p. 15, February 1948.